United States Patent [19]

Naimpally et al.

[11] Patent Number: 5,327,242
[45] Date of Patent: Jul. 5, 1994

[54] VIDEO NOISE REDUCTION APPARATUS AND METHOD USING THREE DIMENSIONAL DISCRETE COSINE TRANSFORMS AND NOISE MEASUREMENT

[75] Inventors: Saiprasad V. Naimpally, Langhorne, Pa.; Jimmy C. Tran, Marlton, N.J.

[73] Assignee: Matsushita Electric Corporation of America, Secaucus, N.J.

[21] Appl. No.: 33,576

[22] Filed: Mar. 18, 1993

[51] Int. Cl.⁵ .................... H04N 5/21; H04N 7/133
[52] U.S. Cl. ................................ 348/606; 348/415
[58] Field of Search ............... 358/167, 36, 133, 136, 358/135; 364/725, 574; 382/54; H04N 5/213, 7/133, 5/21

[56] References Cited

U.S. PATENT DOCUMENTS

| 4,435,751 | 3/1984 | Hori | 364/574 |
|---|---|---|---|
| 4,442,454 | 4/1984 | Powell | 358/167 |
| 4,549,212 | 10/1985 | Bayer | 358/167 |
| 4,807,033 | 2/1989 | Keesen | 358/36 |
| 4,865,031 | 2/1989 | Powell | 358/167 |
| 5,126,842 | 6/1992 | Andrews | 358/167 |
| 5,128,756 | 7/1992 | Johnston et al. | 358/133 |

FOREIGN PATENT DOCUMENTS

| 412713 | 2/1991 | European Pat. Off. | H04N 7/133 |
|---|---|---|---|
| 461659 | 12/1991 | European Pat. Off. | H04N 7/133 |
| 16193 | 1/1989 | Japan | H04N 9/80 |
| 226287 | 9/1989 | Japan | H04N 7/133 |
| 233892 | 9/1989 | Japan | H04N 7/133 |
| 92180 | 3/1990 | Japan | H04N 7/133 |
| 272720 | 3/1990 | Japan | H04N 7/133 |
| 117271 | 5/1990 | Japan | H04N 1/415 |
| 3217183 | 9/1991 | Japan | H04N 7/133 |

Primary Examiner—James J. Groody
Assistant Examiner—Chris Grant
Attorney, Agent, or Firm—Ratner & Prestia

[57] ABSTRACT

A noise component of a video signal is reduced by using a three dimensional discrete cosign transform (3-D DCT) to determine the time frequency spectrum of both the video signal and the noise component, subtracting the time frequency spectrum of the noise component from the time frequency spectrum of the video signal, and converting the time frequency spectrum of the modified video signal back to the spatial time domain by using an inverse 3-D DCT.

22 Claims, 7 Drawing Sheets

VIDEO NOISE REDUCTION APPARATUS AND METHOD USING THREE DIMENSIONAL DISCRETE COSINE TRANSFORMS AND NOISE MEASUREMENT

The invention relates to a system and method for reducing noise in a video signal. More particularly, the invention relates to a signal processing system and method of measuring and reducing a noise component of a video signal by using a three dimensional, 3-D, discrete cosine transform, DCT.

BACKGROUND OF THE INVENTION

A video signal may represent a first series of images converted to electrical energy that also may be transmitted, compressed, decompressed and received by a device which then may use the video signal to generate a second series of images which is ideally substantially similar to the first series of images. During the process of generating the second series of images from the first series of images, (i.e., any combination of the transmitting, compressing, decompressing, receiving, and displaying) a noise component may be added to the video signal so that the signal includes an image component representing the series of images and a noise component. Depending on the magnitude of the noise component, the second series of images may contain noise components which are visible to the viewer of the second series of images.

As a consequence, video noise reduction systems have been developed to attempt to reduce the noise component of the video signal. In U.S. Pat. No. 4,987,481 to Spear et al., the invention is a noise reduction system which averages from 2 to 9 frames, or series of images, of the video signal to determine the noise content in the series of images. This system, however, only works on the portions of the series of images that are similar in color and brightness in each image. In U.S. Pat. No. 5,025,312 to Faroudja, the invention is a noise reduction system which uses recirculation for the portions of the series of images containing low level picture details and selectively cores the moving portions of the series of images. Coring consists of passing only those portions of a signal that have an absolute amplitude level which is greater than some threshold magnitude and zeroing components having magnitudes less than the threshold. Although this system may reduce the noise component of the series of images, the coring or recirculation process may add noticeable artifacts or spurious spatial frequency components to the series of images. Both coring and recirculation may also undesirably reduce the apparent resolution of the series of images.

In U.S. Pat. No. 4,523,230 to Carlson et al., the invention is a noise reduction system which uses an octave spectrum analyzer to separate the video signal into subspectra signals. The system cores one or more of the subspectra signals and then generates a noise reduced video signal by recombining the subspectra signals. This system also may add noticeable artifacts or spurious spatial frequency components to the video signal caused by the coring process.

In U.S. Pat. No. 4,163,258 to Ebihara et al., the invention is a noise reduction system which uses an orthogonal transform to transform the video signal into a number of transformed signal components. Then a process similar to coring is performed on some of the transformed signal components and the transformed signal components are transformed back to a video signal. This system may also add noticeable artifacts or spurious spatial frequency components to the video signal caused by the coring process on the transformed signal components.

These prior art noise reduction systems also reduce the amplitudes of some of the data samples which make up the image component while reducing the noise component of the video signal. The reduction of the amplitudes of some data samples which made up the image component in those systems distorts the series of images represented by the video signal, i.e., reduces the detail or AC energy of the video signal. The reduction, thus, in effect, adds a different type of noise component to the video signal, i.e., a noise component which changes the spatial frequency spectrum of the video signal.

SUMMARY OF THE INVENTION

The present invention is a system and method of processing a first video signal having a noise component and an image component to produce a second video signal representative of the first video signal with the noise component reduced without noticeably reducing the quality of the reproduced image.

The system and method of the present invention performs this process by taking corresponding data samples in a plurality of frames of the first video signal to produce 3-D blocks of data samples of the first video signal.

The 3-D blocks of data samples of the first video signal are transformed by the system and method of the present invention to produce 3-D blocks of time frequency spectrum coefficients of the first video signal.

From selected segments of the 3-D blocks of time frequency spectrum coefficients of the first video signal, the system and method of the present invention generates a time frequency spectrum of the noise component.

The 3-D blocks of time frequency spectrum coefficients of the first video signal and the time frequency spectrum of the noise component are combined in a manner to reduce the noise component. This combination is performed by the system and method of the present invention to produce 3-D blocks of time frequency spectrum coefficients of a second video signal.

Finally, the 3-D blocks of time frequency spectrum coefficients of the second video signal are transformed by the system and method of the present invention to produce corresponding samples in a plurality of frames of the second video signal.

DETAILED DESCRIPTION OF THE INVENTION

Overview

Figure 1:
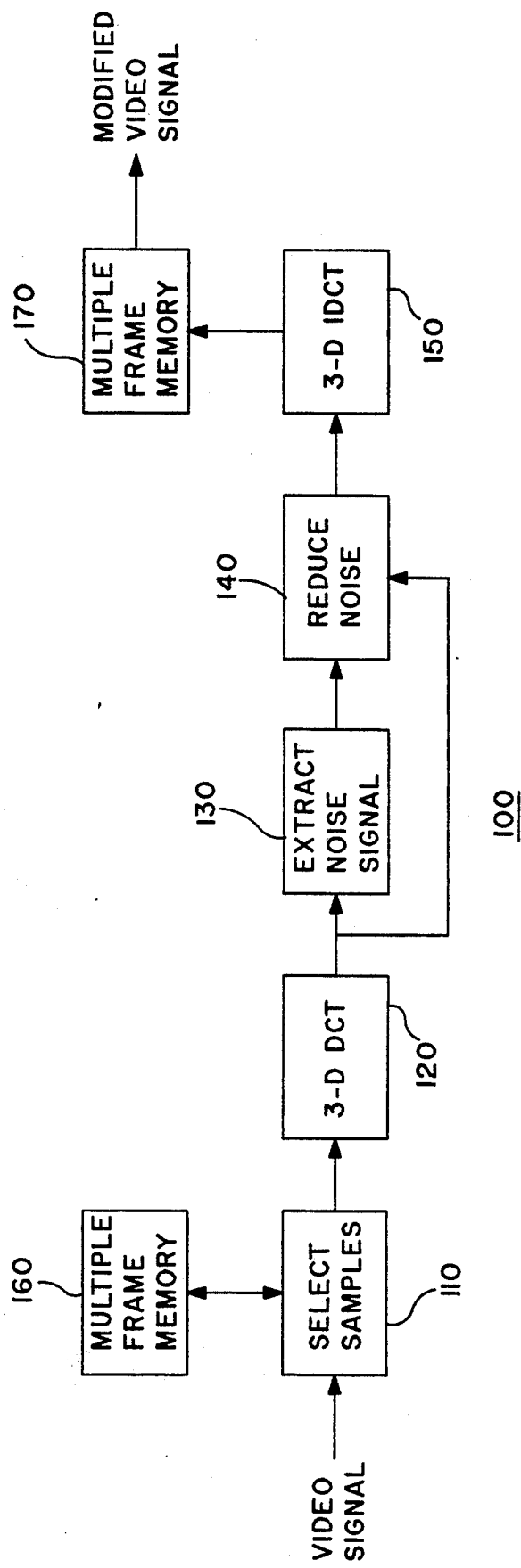
FIG. 1, is a block diagram of a method according to the present invention.

A block diagram of a method which includes an embodiment of this invention is shown in FIG. 1. A brief overview of the invention is presented by reference to this diagram. As shown in FIG. 1, the method includes the steps of selecting (110) data samples from a video signal, determining (120) a three dimensional, 3-D, discrete cosine transform (DCT) of the selected data samples, extracting (130) a noise signal from the transformed selected samples, reducing (140) the noise component in the video by compensating the transformed data samples for the noise signal, determining (150) a 3-D inverse DCT (IDCT) of the reduced noise signal to generate a second video signal, and storing and retrieving noise reduced data samples from multiple frame memories 160 and 170.

This method is an extension of the two dimensional noise reduction technique described by J. S. Lim, in a book entitled "Two-Dimensional Signal and Image Processing", published by Prentice-Hall of Englewood Cliffs, New Jersey in 1990 at pages 545 to 546 which is hereby incorporated by reference for its teaching on transform techniques for reducing the presence of noise in a signal.

Referring again to this invention, the first step of the method 100, selecting (110) data samples, varies with different embodiments of the invention. In each embodiment, however, this step includes time sampling the video signal if the video signal is an analog video signal. In the first embodiment, this step also includes selecting areas of data samples from a time sequential series of images represented by the video signal to generate a 3-D block of data samples which are used to represent the noise component for the time sequential series of images. In this first embodiment, the step uses motion estimation, ME, to locate similar image content areas of data samples in each of a set of time sequential series of images. The similar image content areas of data samples from each of the set of time sequential series of images are then combined to form a 3-D block of data samples. The 3-D image content area of data samples is transformed by a 3-D orthogonal transform to generate the noise signal in the next step of the method 100.

In another embodiment of the invention, the 3-D image block of data samples which is used to generate the noise signal is selected after the 3-D DCT (120) is determined. In either embodiment, however, the step of selecting (110) data samples includes storing the selected data samples representing a set of time sequential images in the multiple frame memory 160. The 5 step (110) also includes retrieving data samples from the multiple frame memory 160 to form 3-D blocks of time spatial samples from corresponding data samples in the set of time sequential images or frames.

The next step, 120, determining the 3-D DCT of the data samples, transforms a selected 3-D block of time spatial samples generated by the previous step (110) to produce a 3-D block of time frequency spectrum coefficient values. This step (120) uses a 3-D orthogonal transform, in the exemplary embodiment, a 3-D DCT, to transform time spatial information to time frequency spectrum information. Discrete Cosine Transforms, DCTs, are well known to those skilled in the art of noise reduction techniques. Three dimensional DCTs, 3-D DCTs, are also well known to those skilled in the art of image compression techniques. An example of a system for determining a 3-D DCT is described in U.S. Pat. No. 5,126,962 entitled, DISCRETE COSINE TRANSFORM PROCESSING SYSTEM to Chiang, which is hereby incorporated by reference for its teachings on 3-D DCTs. Examples of other types of orthogonal transforms that may be used in this invention include Discrete Fourier Series and Discrete Hilbert Transforms.

In one embodiment of the method, particular 3-D blocks of time spatial samples transformed by this step 120 are used to generate the noise signal. This step 120 may also include storing the transformed 3-D blocks of time spatial samples in the multiple frame memory 160.

The next step of the method 100, step 130, generates a noise signal for the set of time sequential series of images of data samples which are used to generate the transformed 3-D blocks of time spatial samples. In one embodiment, this step 130 selects a portion of the transformed 3-D blocks generated by the first step 110 as the 3-D block of time frequency spectrum coefficient values of the noise component or noise signal. In another embodiment, this step 130, selects and combines one or more transformed 3-D blocks of time spatial samples to be used to generate a noise signal.

In the second embodiment, the selected transformed 3-D blocks of time spatial samples are taken from 3-D blocks of data samples that should be stationary, i.e., should have no motion from frame to frame, such as during the horizontal or vertical blanking interval in a composite video signal. Any motion or non-DC elements in these 3-D blocks of data samples represents the noise component of these sample areas.

The inventors have found that the motion components in these 3-D blocks of data samples represent the noise component for the set of 3-D blocks of data samples in the time sequential series of images from which the 3-D blocks of data samples were selected. The root mean square, RMS, of the selected transformed 3-D blocks of time spatial samples is then determined in this alternative embodiment of the invention. Coefficients of the resulting 3-D block of time frequency spectrum coefficient values which represent the noise signal may also be scaled by factors in a Look-up Table (LUT).

The next step, step 140, of the method 100 reduces the noise signal in the video signal by combining the signals generated by the two previous steps 120 and 130. The combined signals generate transformed 3-D block of time spatial samples with the measured noise signal removed and thus the noise component of the video signal reduced. In one embodiment of the invention, this step includes determining the square root of the sum of the squares of the corresponding coefficient values of both the transformed 3-D blocks of time spatial samples and the 3-D block of coefficient values representing the noise signal. The result is a modified transformed 3-D block of time spatial samples.

In another embodiment of this invention, a modified transformed 3-D block of time spatial samples is generated as a function of the transformed 3-D blocks of time spatial samples and the 3-D block of coefficient values representing the noise signal. In this embodiment, each coefficient of the modified transformed 3-D block of time spatial samples is set equal to the signed absolute difference of the corresponding coefficient of the transformed 3-D block of time spatial samples and the 3-D block of coefficient values representing the noise signal if the coefficient of the transformed 3-D block of time spatial samples is greater than or equal to in magnitude to the corresponding coefficient of the noise signal. Otherwise, the corresponding coefficient of the modified transformed 3-D block of time spatial samples is set to zero.

In either embodiment, the last step, step 150, of the method 100 determines the inverse 3-D transform of the modified transformed 3-D blocks of time spatial samples, i.e., the transformed sample areas are converted back to the time spatial domain. The resulting 3-D blocks of time spatial samples are then stored in a multiple frame memory 170 or 160. In one embodiment, there is only one multiple frame memory used for both steps 110 and 150. The transformed 3-D blocks of time spatial samples represent a second video signal with a reduced noise component. This step 150 performs this process for all the 3-D blocks of time spatial samples that make up the set of time series of images from whom the 3-D blocks of time spatial samples were selected. Last, this step retrieves the samples from the multiple frame memory 160 or 170, and transmits them in the same time sequential order as for the video signal processed by this method 100.

DETAILED DESCRIPTION OF THE EXEMPLARY EMBODIMENT

Figure 2:
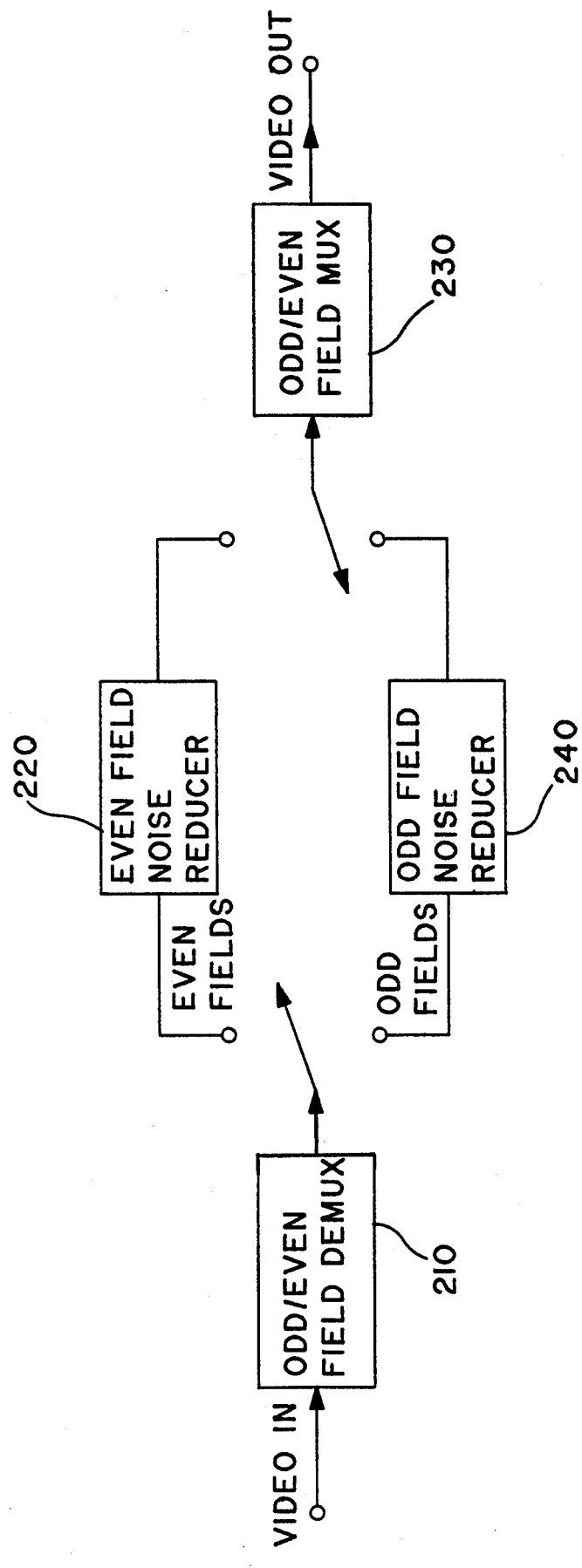
FIG. 2 is a block diagram of a first exemplary embodiment of this invention.

One exemplary embodiment of the invention is described in detail with reference to FIGS. 2-6. In this embodiment of the invention, the video signal input to the system is a sampled-data interleaved video signal, i.e., the data samples of the video signal represent frames or images that are displayed in lines which are interleaved into odd and even image fields. As shown in FIG. 2, this system 200 first demultiplexes (210) the video signal into odd and even fields, then performs noise reduction separately on each field (220 and 240) and last multiplexes (230) the fields to generate a second video signal. This system may also need timing information (not shown) supplied to the field demultiplexer 210 and field multiplexer 230 to indicate when the data samples are part of the odd field and even field of each frame or image of the video signal input to the demultiplexer 210. It is desirable to reduce to noise in the odd and even fields separately in an interleaved video signal because combining the odd and even fields to generate a single frame may reduce the vertical resolution in the frame to as little as one-half of its current level.

Figure 3:
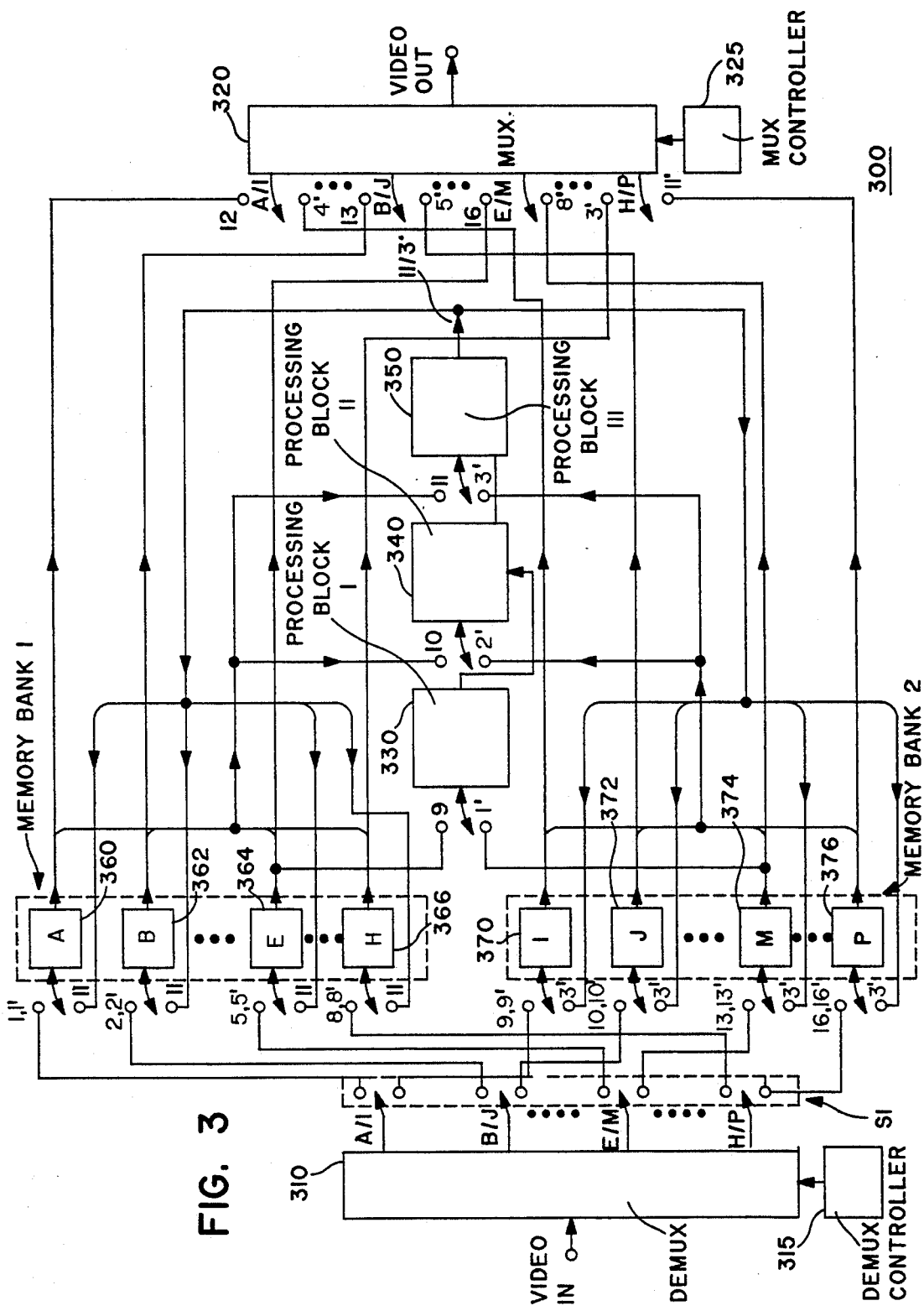
FIG. 3 illustrates an exemplary embodiment of the noise reducers shown in the block diagram of FIG. 2.

An exemplary embodiment of a video noise reduction system 300 that may be used on even fields, odd fields or entire frames of a video signal is shown in FIG. 3. When discussing this system 300, frames will be referred to generically as odd fields, even fields, or entire frames of a video signal. The system 300 includes a demultiplexer 310, a demultiplexer controller 315, a multiplexer 320, a multiplexer controller 325, processing blocks I 330, II 340, and III 350, and two sets of eight frame memories, frame memories A 360 to H 366, and frame memories I 370 to P 376.

The video signal input to this system 300 includes frames of video data where each frame comprises a fixed number of data samples. The demultiplexer 310 under the control of the demultiplexer controller 315, directs data samples corresponding to different frames to sixteen different frame memories A 360 to P 376. In this embodiment, eight frames of data samples are processed at a time by the processing blocks I, II, and III while another eight frames of data samples are being stored. Thus, while the data samples in frame memories A 360 to H 366 are being processed by processing blocks I, II, or III, the demultiplexer is storing the next eight frames of data samples in frame memories I 370 to P 376.

Similarly, the demultiplexer stores data samples in frame memories A 360 to H 366 while the data samples stored in frame memories I 370 to P 376 (the second set of frame memories) are being processed by processing blocks I, II, or III. This is done only after the data samples in the eight frame memories A 360 to H 366 (the first set of frame memories) have been processed by processing blocks I, II, and III and transferred out of the system 300 by the multiplexer 320 under the control of the multiplexer controller 325. This type of memory configuration is commonly referred to as a Ping-Pong memory configuration.

In this embodiment of this system 300, eight frames of data samples are processed at a time by processing blocks I, II, and III. Processing blocks I and II are used to generate an $8 \times 8 \times 8$ block of DCT coefficients which represent the transformed noise component of the eight frames of data samples. Processing block III is used to transform $8 \times 8 \times 8$ blocks of data samples from the eight frames and process these transformed blocks in accordance with the transformed noise component to generate noise reduced transformed $8 \times 8 \times 8$ blocks of data samples. Last, processing block III, performs an inverse transform of the noise reduced transformed $8 \times 8 \times 8$ blocks of data samples back to $8 \times 8 \times 8$ data samples and stores these inverse-transformed data samples in the corresponding areas of the frame memories.

Processing blocks I and II are used to select an 8x8x8 block of data samples, from the set of eight frame memories currently being processed, which represents the noise component of the eight frames of data samples. Block II then determines the 3-D orthogonal transform of the selected $8 \times 8 \times 8$ block of data samples. In this embodiment of the invention, one frame is first selected as a reference frame, in this exemplary embodiment of processing block I, frame 5. Then, in processing block I, a number of the $8 \times 8$ blocks of data samples in the reference frame that have the highest AC energy content are selected. In the exemplary embodiment of the invention, 10 $8 \times 8$ blocks are selected.

Figure 4:
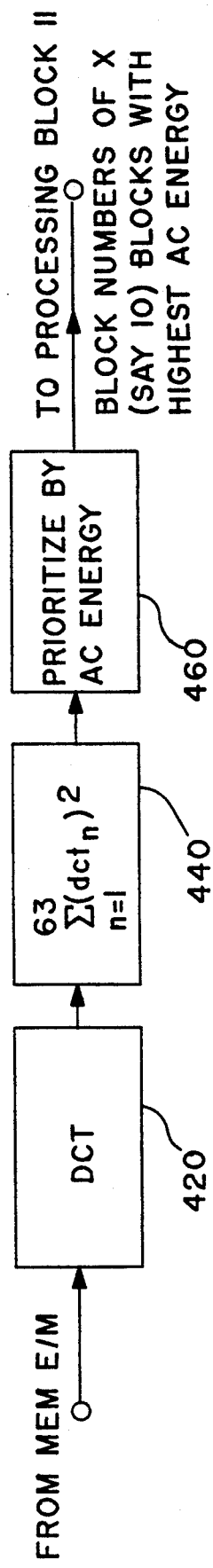
FIG. 4 illustrates an exemplary embodiment of the processing block I shown in FIG. 3.

FIG. 4 shows an exemplary embodiment of processing block I. Processing block I includes a DCT processor 420, an AC power computation unit 440, and a prioritizer 460. Data samples in $8 \times 8$ blocks are retrieved from the reference frame, in this embodiment the 5th frame, of one of the two sets of frame memories, i.e., either from frame memory E or M depending on which set of frame memories is currently being processed. The DCT processor 420 determines the 2-D orthogonal transform of each $8 \times 8$ block retrieved from the reference frame. Each resulting transformed $8 \times 8$ block represents the spatial frequency content of the $8 \times 8$ block. In this representation, the first coefficient of the transformed block represents the DC energy of the $8 \times 8$ block and the remaining 63 coefficients representing the amplitude of successively higher discrete frequency components in the 8x8 block. The AC power computation unit 440 sums the squares of the 63 higher-order coefficients in each transformed $8 \times 8$ block. The result of the computation is a measure of the AC power in each $8 \times 8$ block. Then the determined AC powers for each $8 \times 8$ block retrieved from the reference are prioritized by the prioritizer 460 according to the AC energy level. A number of 8×8 blocks, in this exemplary embodiment, 10, having the highest measured AC energy levels are passed to the next processing block, processing block II.

In processing block II, matching 8×8 blocks for the 8×8 blocks retrieved from the reference frame and passed from processing block I are found in each of the 7 other frames of the set of frames currently being processed. Then the set of 8×8 matching blocks which has the lowest overall mean square error, MSE, difference between the reference 8×8 block and the matching blocks in the seven other frames is selected. These 8×8 blocks form an 8×8×8 block of data samples which is representative of the noise component of the set of frame memories being processed.

Blocks having the highest AC energy are selected in this embodiment because the inventors have found that using a MSE criterion for determining the best matched blocks works well with high AC energy blocks. The inventors have found that using the MSE criterion for reference blocks that have low AC areas or flat areas sometimes leads to errors.

Figure 5:
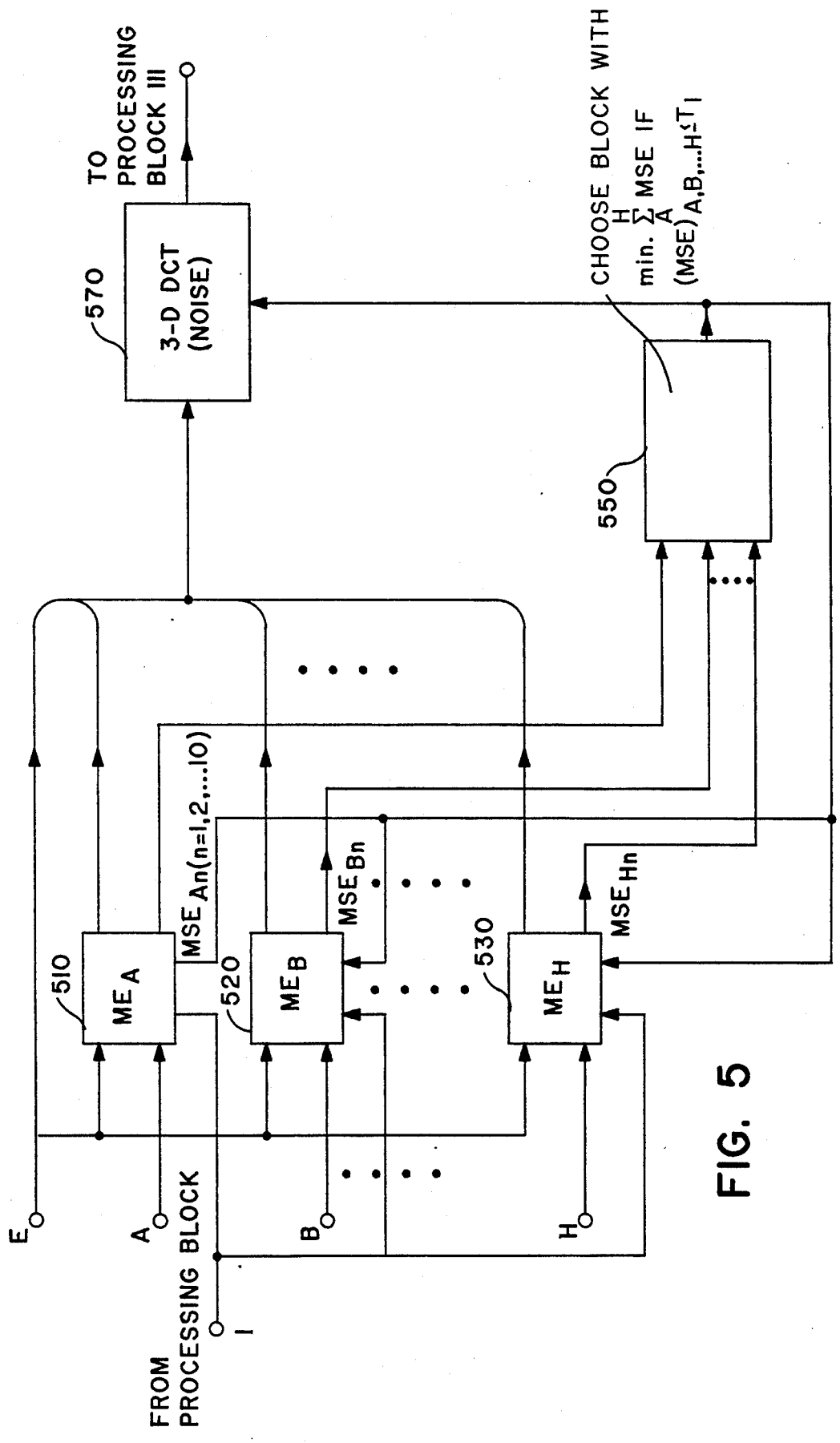
FIG. 5 illustrates an exemplary embodiment of the processing block II shown in FIG. 3.

An exemplary embodiment of processing block II which is processing the first set of frame memories is shown in FIG. 5. As shown in this Figure, processing block II includes motion estimators, MEs, 510, 520 and 530, a MSE evaluation unit 550, and a 3-D DCT processor 570. The motion estimators, MEs, determine corresponding 8x8 blocks in each of the other seven frames for the 10 reference 8x8 blocks passed from processing block I. The motion estimators in this embodiment use a standard block matching technique to locate matching blocks in the other frames. Other block matching techniques may also be used, some such techniques are disclosed U.S. Pat. No. 5,093,720 entitled Motion Compensation for Interlaced Digital Television Signals and in allowed U.S. patent application Ser. No. 07/764,187 entitled Derivation and Use of Motion Vectors in a Differential Pulse Code Modulation System which are incorporated by reference for their teachings on block matching techniques.

The motion estimators also determine the mean square error, MSE, or difference, between each reference 8x8 block and the corresponding 8×8 blocks located in each of the other 7 frames. The MSE difference is the criterion used in the exemplary embodiment of this invention to determine how well a reference block matches another block. Other criteria may also be used in this invention, such as mean absolute difference as disclosed in allowed U.S. patent application No. 07/788,026 entitled Noise Reduction in Frame Transmitted Video Signals which is hereby incorporated by reference for its teaching on different block matching criteria.

In the exemplary embodiment of the invention, the MSE evaluation block 550 selects the reference 8x8 block based on two criteria. First, MSE between a reference 8x8 block and any of its seven matching blocks must be less than threshold, $T_1$, where $T_1$ is determined experimentally. Second, of those group of blocks which meet the first criterion, the group of blocks having the lowest total MSE, i.e., the sum of the MSE between each of the seven blocks and the reference block, is selected as the 8x8x8 block to be used as a measure of the noise signal. The 8x8x8 block is formed thus from the selected reference block and the corresponding 8×8 blocks located by the MEs 510, 520 and 530 in the 7 other frames meeting the two criteria.

A 3-D orthogonal transform of this 8x8x8 block is determined by the 3-D DCT processor 570. The resultant 8x8x8 transform block is a measure of the time frequency spectrum of the noise component of the set of eight frames of data samples. The 8×8×8 block is considered a measure of the noise presence in the set of eight frames because, after finding the best matched blocks in the eight blocks with high AC energy, the difference or non-stationary aspects between each block in the eight frames is considered to caused by random noise rather than by motion or change in the portion of the image represented by the block between each of the eight frames.

The first 8×8 section of the 8×8×8 transform block, however, represents only the spatial frequency information of the image and thus is not generally considered a part of the noise component. This assumes that the noise component is random in nature and thus not stationary. Certain types of noise, however, may be present in this first 8×8 section such that it may be used to reduce some spatial frequency noise components if the characterization of this form is known and passed to processing block III into some memory area (not shown). This 8x8x8 transformed noise component block is passed to the next processing block, processing block III, where it is used to reduce the noise component in the set of eight frames of data samples.

Figure 6:
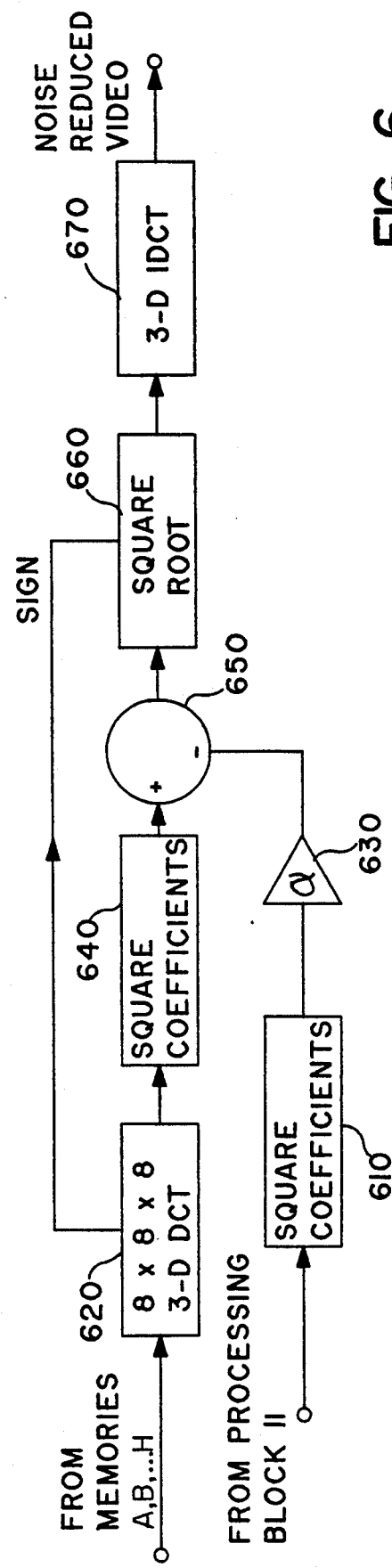
FIG. 6 illustrates an exemplary embodiment of the processing block III shown in FIG. 3.

An exemplary embodiment of processing block III which is processing the first set of frame memories is shown in FIG. 6. As shown in this Figure, processing block III includes a 3-D DCT 620, two squaring units 610 and 640, a multiplier 630, a subtracter 650, a square root with sign information unit 660 and a 3-D IDCT processor 670. Processing block III uses the 8×8×8 noise block passed from process block II to reduce the noise component in all the 8×8×8 blocks of data samples in the set of eight frames of sample data.

This processing block segments the set of eight frames of sample data into 8×8×8 blocks, and then transforms each of the 8×8×8 blocks by a 3-D orthogonal transform, in the exemplary embodiment, by a 3-D DCT processor 620. The squares of the coefficient values of each transformed 8x8x8 block of data samples are determined by the squaring unit 640. The squares of the coefficient values of the noise block are determined by the squaring unit 610. The squared coefficient values of the noise block are multiplied by a factor $\alpha$, where $\alpha$ is greater than 1 and is determined experimentally. The differences of corresponding coefficient values of the transformed 8×8×8 block of data samples and the transformed noise block are determined by the subtracter 650. The square roots of the resulting differences are determined and multiplied by the sign of the corresponding coefficient values in the transformed 8×8×8 block of data samples by the square root and sign information unit 660.

The resulting values are coefficient values which replace corresponding coefficient values in the transformed 8×8×8 block of data samples. Note, however, that not all the coefficient values in the transformed 8×8×8 block of data samples are replaced. As noted above, the coefficient from the first 8×8 section of the transformed data sample block represent unvarying spatial frequency components of the image and thus in the exemplary embodiment of this invention are not replaced. In another embodiment of the invention, certain coefficients from this 8×8 section of the transformed 8×8×8 block of data samples may be replaced or modified if the noise component includes certain stationary forms of noise whose characteristic have been provided to the processing block III or which can be readily recognized.

The resulting 8×8×8 transformed block of data samples, with certain coefficient values replaced, is used to determine a new 8×8×8 block of data samples by taking the inverse 3-D orthogonal transform of the modified transformed 8×8×8 block of data samples. In the exemplary embodiment of this invention, this process is performed by the 3-D IDCT processor 670. The new 8×8×8 block of data samples is representative of the original 8×8×8 block of data samples with the noise component reduced. The new 8x8x8 block of data samples is then stored in the appropriate locations in the set of eight frame memories currently being processed. This process is performed on all the 8×8×8 segments of the set of eight frame memories using the same 8×8×8 of coefficients representing the noise signal.

Referring again to FIG. 3, after block III has processed all the segments of the set of eight frames of data samples, the data samples are transferred out of the system 300 as a second video signal. The multiplexer 320 under the control of the multiplexer controller 325, selects which frame memories are to be used to retrieve data samples and places the retrieved data samples at the output port of the system 300. The retrieved data samples placed at the output port of the system 300 represent a second video signal representative of the video signal input to the system 300 with the noise component reduced.

Figure 7:
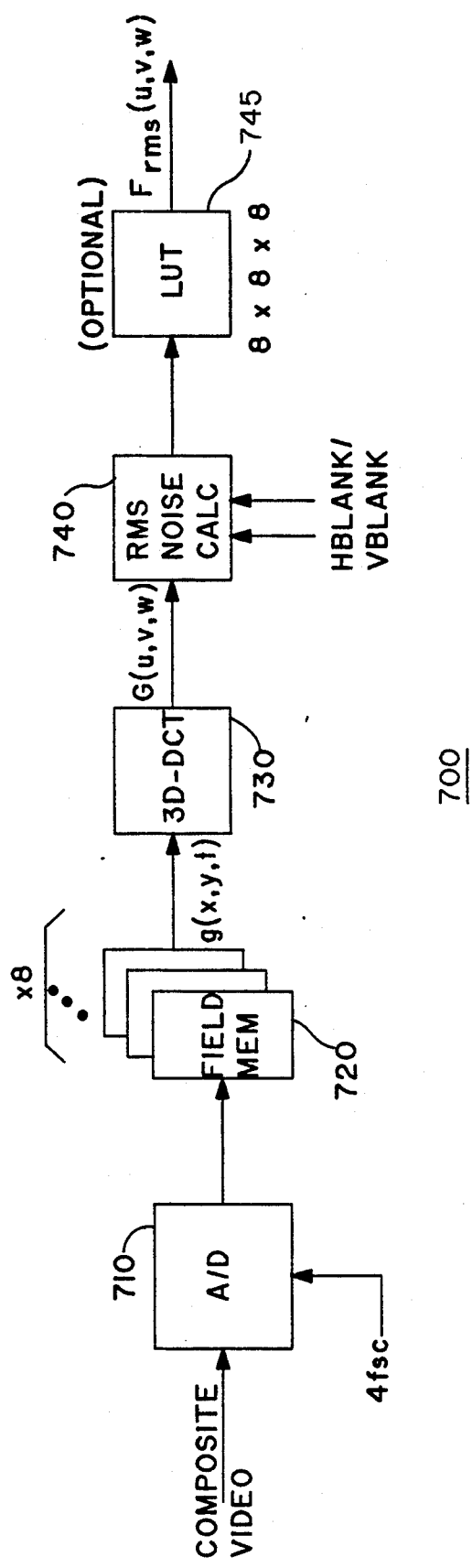
FIG. 7 is a block diagram of a second exemplary embodiment of this invention.
Figure 7:
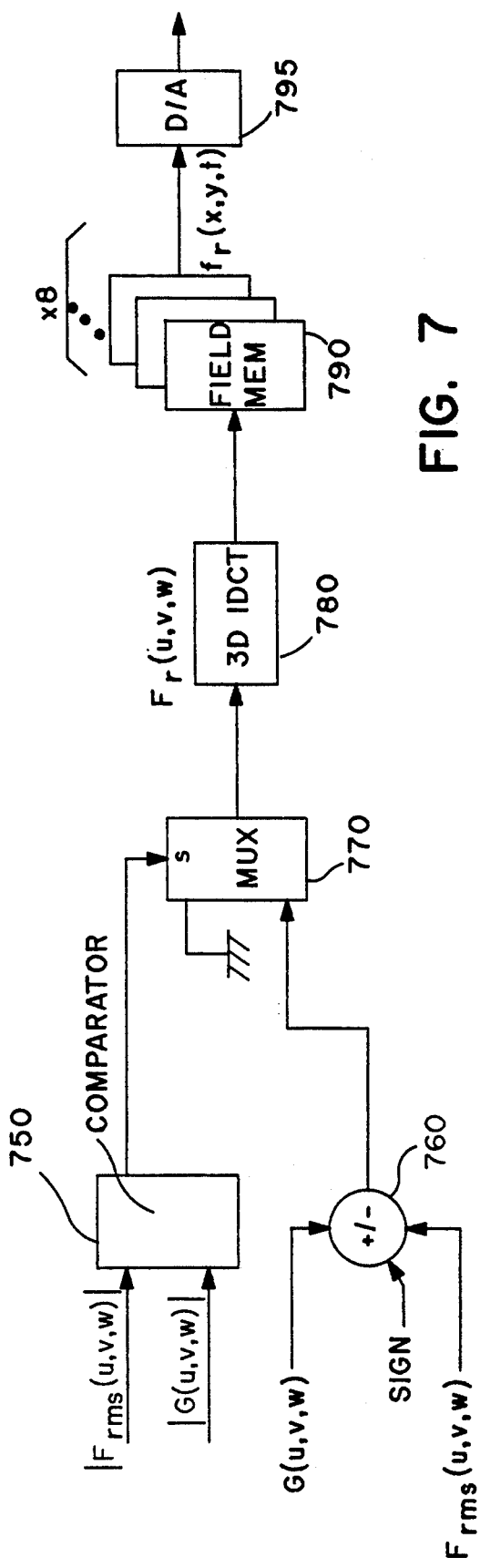

Another exemplary embodiment of the invention is described briefly with reference to FIG. 7. As shown in this Figure, this system is similar to the previous embodiment except for one major difference and one minor difference. The major difference between the two embodiments is the method of determining the noise signal. In this alternative embodiment, the noise signal is determined by selecting corresponding 8x8 blocks of data samples from 8 consecutive frames of data samples where the 8x8 blocks are in an area of the video signal that should contain no motion such as during certain portions of the vertical blanking or horizontal blanking interval of a composite video signal. The inventors have found that the motion information in these areas is normally representative of the noise signal present throughout the set of frames of data samples from which the noise signal is determined.

The minor difference between the two embodiments of the invention is in the technique of removing the measured noise signal from the respective set of frames of data samples from which the noise signal was generated. In this second embodiment, the technique uses fewer computations to remove the measured noise signal than is used by the first embodiment.

In this alternative embodiment, as shown in FIG. 7, the relative magnitudes of corresponding coefficient values of the transformed noise signal and transformed 8×8×8 blocks of data samples are compared. If the magnitude of the noise signal coefficient value is greater than the corresponding coefficient value for the transformed 8×8×8 block of data samples, then the respective coefficient in the transformed 8×8×8 block of data samples is set to zero. Otherwise, if the corresponding coefficient value of transformed 8×8×8 block of data samples is greater than zero, then the respective coefficient value is set equal to the difference between the corresponding coefficients. Otherwise, if the corresponding coefficient of the transformed block of data samples is less than or equal to zero, then the respective coefficient is set to the sum of the corresponding samples. This technique uses fewer computations that finding the square root of the difference of the squares of the corresponding coefficients, i.e., the technique used in the other exemplary embodiment of the invention.

As shown in FIG. 7, the alternative embodiment of the invention includes an analog to digital converter (A/D) 710, frame or field memories 720 and 790, a 3-D DCT processor 730, a RMS Noise calculation device 740, a Look-up Table, LUT 745, a comparator 750, an adder 760, a multiplexer 770, and an Inverse 3-D DCT processor 780. The A/D 710 samples the video signal input to the system 700. In this example, the video signal input to the system 700 is a composite analog video signal. The composite analog signal has a standard configuration of baseband luminance information and quadrature phase modulated chrominance information along with vertical and horizontal blanking information. Such a standard composite analog video signal is described in the book entitled *Television Electronics—Theory and Service*, by Milton Kiver and Milton Kaufman, 8th Edition, published by Van Nosrand Reinhold Co., Inc. of New York in 1983, pages 16–67, which is hereby incorporated by reference for its teachings on composite analog video signals. In the exemplary embodiment of this invention, the A/D 710 samples the composite analog video signal at four times the frequency that the chrominance information is modulated in the signal, i.e., 4.fsc. The digital data samples are then stored in field memories 720.

The field memories 720 may hold odd or even fields of frames of video information separately or may hold single frames of video information. The field memories 720 and 790 may also be Ping-Pong memories and thus operate in a manner similar to the operation of the memories used in the first exemplary embodiment of the invention. These field memories 720 and 790 are used to store data values representing 8 fields of a video image. The field memory 720 is used to provide 8×8×8 blocks of digital data samples to the 3-D DCT processor 730.

The 3-D DCT processor 730 is used to find a 3-D orthogonal transform of the 8×8×8 block of digital data samples, referred to as g(x,y,t). The resultant transformed 8x8x8 block, referred to as G(u,v,w), contains coefficients which indicate the level of specific frequencies in the 8x8x8 block of digital data samples, g(x,y,t). Certain transformed blocks G(u,v,w) are selected by the Root Mean Square, RMS, Noise calculator 740 to be used to determine a measure of the noise signal present in the set of fields stored in the field memory 720.

The RMS noise calculator 740 selects certain transformed blocks G(u,v,w) as reference blocks and then finds the RMS value of each transformed coefficient in these blocks. The RMS of these reference blocks represents a measure of the noise signal present in the set of eight fields of digital data samples. The reference blocks selected are those from the area of the field that represent either a section of the horizontal blanking interval or the vertical blanking interval. As noted in FIG. 7, the RMS noise calculator 740 receives a HBlank and VBlank signal which indicate when the 8x8x8 transformed block G(u,v,w) represents a segment of the horizontal or vertical blanking interval in the field of the video signal. The inventors have found that desirable to use segments of the horizontal blanking interval as reference blocks. Particularly desirable are segments in the front porch interval of the horizontal blanking interval immediately before the horizontal synchronization pulse. The back-porch interval of the horizontal blanking interval is less desirable since it contains the color reference burst signal.

In a variation of the alternative embodiment of the invention, the RMS noise calculator 740 first finds the RMS of a number reference blocks from the set of eight fields to generate an 8×8×8 block representing the noise signal, where the number is determined experimentally. Then selected coefficient values of the 8×8×8 noise signal block are scaled by the LUT 745.

Thus, the LUT 745 is used to scale selected coefficient values of the 8×8×8 noise signal block. In another variation of the alternative embodiment of the invention, the LUT may not be used to modify the coefficients of the 8×8×8 noise signal block generated by the RMS noise calculator 740. In either embodiment, however, the resulting coefficients of the 8x8x8 noise signal block represent the noise signal, referred to as $F_{rms}(u,v,w)$, present in the set of eight fields of digital data samples.

The remaining portion of the system 700, i.e., the comparator 750, the adder 760, the multiplexer 770, and the Inverse 3-D DCT processor 780 are used to remove the measured noise signal, i.e., the coefficients of the 8×8×8 noise signal block, from the set of eight fields of digital data signals. It should be noted that this process is performed across the entire field including the horizontal and vertical blanking portions of the fields. The inventors have found that by performing this process across the entire field, noise is removed from the color reference burst signal in the horizontal blanking interval. This in turn, sharpens the colors in the resulting image that is produced by some video display screen by increasing the accuracy of the phase lock achieved from the color reference burst signal.

The remaining portion of the system 700 operates similarly to the first exemplary embodiment of the invention. This embodiment, however, is less computationally intense and thus has greater commercial application. The comparator 750, the adder 760, and the multiplexer 770 are used to generate a modified transformed 8×8×8 block of digital data samples, referred to as $F_r(u,v,w)$, from the transformed block of digital data samples, $G(u,v,w)$ and the measured noise signal, $F_{rms}(u,v,w)$. In detail, each coefficient value of the modified transformed 8x8x8 block of digital data samples $F_r(u,v,w)$ is determined from the corresponding coefficients in the transformed block of digital data samples, $G(u,v,w)$ and the measured noise signal, $F_{rms}(u,v,w)$.

Namely, if the magnitude of the coefficient value of $G(u,v,w)$ is less than the magnitude of the corresponding coefficient value of the $F_{rms}(u,v,w)$, then the corresponding coefficient value in $F_r(u,v,w)$ is set to zero. If the coefficient value of $G(u,v,w)$ is greater than zero, then the corresponding coefficient in $F_r(u,v,w)$ is set to the coefficient value of $G(u,v,w)$ less the corresponding coefficient value of the $F_{rms}(u,v,w)$. Otherwise, the corresponding coefficient value in $F_r(u,v,w)$ is set to the coefficient value of $G(u,v,w)$ plus the corresponding coefficient value of $F_{rms}(u,v,w)$.

In the exemplary embodiment of the alternative embodiment of the invention, this process is performed for all the coefficients in the transformed 8×8×8 blocks except for the first 8x8 set of coefficients because these coefficients represent the unvarying spatial frequency of the digital data samples. As noted above in the description of the first exemplary embodiment of the invention, certain of these coefficient values may also be changed in another embodiment depending on the nature of the noise signal present in the video signal if the noise characteristic of these coefficients is provided or can readily be determined.

Once the modified 8×8×8 transformed block of digital data samples, $F_r(u, v, w)$ is determined, the inverse transform of this block is generated by the 3-D IDCT processor 780. The 3-D IDCT processor determines the inverse 3-D orthogonal transform of the 8×8×8 block, $F_r(u,v,w)$. The resulting 8×8×8 blocks, referred to as $f_r(x,y,t)$, are representative of the 8×8×8 blocks of digital data samples g (x, y, t) with the measured noise signal $F_{rms}(u, v, w)$ removed Each of the 8×8×8 blocks of digital data samples for the set of eight field of the digital data samples are stored in the field memory 790. When all of the 8x8x8 blocks of digital data samples $f_r(x,y,t)$ for the set of eight fields of digital data samples have been stored in the field memory 790, the digital data samples $f_r(x,y,t)$ are transferred out of the system 700 in the same order as the corresponding digital data samples were input to the system 700, i.e., First-In First-Out (FIFO) order.

The resulting second video signal, fr(x,y,t) is a composite digital video signal. The signal may be converted back to a composite analog video signal by a Digital to Analog converter (D/A) 795.

While the invention has been described in terms of an exemplary embodiment, it is contemplated that it may be practiced with modifications within the spirit and scope of the appended claims.

What is Claimed:

1. A method of processing a first video signal having a noise component to produce a second video signal representative of the first video signal with the noise component reduced, said method comprising the steps of:

(a) taking corresponding data samples in a plurality of frames of the first video signal to produce three dimensional (3-D) blocks of time spatial samples of the first video signal;

(b) transforming the 3-D blocks of time spatial samples of the first video signal to produce 3-D blocks of time frequency spectrum coefficients of the first video signal;

(c) generating, from selected segments of the 3-D blocks of time frequency spectrum coefficients of the first video signal, a 3-D block of time frequency spectrum coefficients of the noise component;

(d) modifying the 3-D blocks of time frequency spectrum coefficients of the first video signal as a function of the 3-D block of time frequency spectrum coefficients of the noise component to produce modified 3-D blocks of time frequency spectrum coefficients which represent the second video signal; and (e) transforming the modified 3-D blocks of time frequency spectrum coefficients which represent the second video signal to produce corresponding 3-D blocks of data samples in a plurality of frames of the second video signal.

2. A method according to claim 1, where step (b) and (e) use a 3-D orthogonal transform.

3. A method according to claim 2, where the 3-D orthogonal transform is a 3-D Discrete Cosine Transform.

4. A method of processing a first video signal having a noise component to produce a second video signal representative of the first video signal with the noise component reduced, said method comprising the steps of:
  (a) taking corresponding data samples in a plurality of frames of the first video signal to produce three dimensional (3-D) blocks of time spatial samples of the first video signal;
  (b) transforming the 3-D blocks of time spatial samples of the first video signal to produce 3-D blocks of time frequency spectrum coefficients representing the first video signal;
  (c) generating, from selected segments of the 3-D blocks of time frequency spectrum coefficients of the first video signal, a 3-D block of time frequency spectrum coefficients representing the noise component of the video signal to the substantial exclusion of any other components;
  (d) modifying the 3-D blocks of time frequency spectrum coefficients of the first video signal as a function of the 3-D block of time frequency spectrum coefficients which represent the noise component to produce modified 3-D blocks of time frequency spectrum coefficients which represent the second video signal, wherein step (d) includes the step of generating modified 3-D blocks of time frequency spectrum coefficients which represent the second video signal from sums and differences of corresponding coefficients of the 3-D first video signal and the 3-D blocks of time frequency spectrum coefficients which represent the noise component; and
  (e) transforming the modified 3-D blocks of time frequency spectrum coefficients which represent the second video signal to produce corresponding 3-D blocks of data samples in a plurality of frames of the second video signal.

5. A method according to claim 4 wherein:
  step (a) further comprises the step of generating one 3-D block of time spatial samples by using motion estimation (ME) to locate similar image content blocks of time spatial samples in each of the plurality of frames of the first video signal and forming the one 3-D block of time spatial samples from the selected similar image contents blocks of time spatial samples located by the ME;
  step (b) further comprises the step of transforming the one 3-D block of time spatial samples to a one 3-D block of time frequency spectrum coefficients; and
  step (c) comprises the step of generating, from the one 3-D block of time frequency spectrum coefficients, a 3-D block of time frequency spectrum coefficients of the noise component.

6. A method according to claim 4 where step (c) comprises the steps of:
  selecting a plurality of 3-D blocks of time frequency spectrum coefficients of the first video signal, the selected blocks representing image content areas of the first video signal that should not change from frame to frame in the plurality of frames of the first video signal; and
  generating, from selected segments of the plurality of the 3-D blocks of time frequency spectrum coefficients of the first video signal, a 3-D block of time frequency spectrum coefficients of the noise component.

7. A method according to claim 6, where in step (c), the plurality of the 3-D blocks of time frequency spectrum coefficients of the first video signal are selected from image content areas of the first video signal that represent horizontal or vertical blanking intervals of the first video signal.

8. A method according to claim 4 where step (d) comprises the steps of:
  determining square roots of sums of squares of corresponding coefficients of each 3-D block of time frequency spectrum coefficients of the first video signal and the 3-D block of time frequency spectrum coefficients of the noise component, where the time frequency spectrum coefficients of the first video signal have a sign; and
  generating modified 3-D blocks of time frequency spectrum coefficients which represent the second video signal from the determined square roots and the sign of the corresponding coefficients of the 3-D block of time frequency spectrum coefficients of the first video signal.

9. A method according to claim 4 wherein:
  step (a) further comprises the step of generating one 3-D block of time spatial samples by using motion estimation (ME) to locate similar image content blocks of time spatial samples in each of the plurality of frames of the first video signal and forming the one 3-D block of time spatial samples from the selected similar image contents blocks of time spatial samples located by the ME;
  step (b) further comprises the step of transforming the one 3-D block of time spatial samples to one 3-D block of time frequency spectrum coefficients;
  step (c) comprises the step of generating, from the one 3-D block of time frequency spectrum coefficients, a 3-D block of time frequency spectrum coefficients of the noise component; and
  step (d) comprises the steps of:
    determining square roots of sums of squares of corresponding coefficients of each 3-D block of time frequency spectrum coefficients of the first video signal and the 3-D block of time frequency spectrum coefficients of the noise component, where the time frequency spectrum coefficients of the first video signal have a sign; and
    generating modified 3-D blocks of time frequency spectrum coefficients which represent the second video signal from the determined square roots and the sign of the corresponding coefficients of the 3-D block of time frequency spectrum coefficients of the first video signal.

10. A method according to claim 4 wherein: step (c) comprises the steps of:
  selecting a plurality of 3-D blocks of time frequency spectrum coefficients of the first video signal, the selected blocks representing image content areas of the first video signal that should not change from frame to frame in the plurality of frames of the first video signal; and
  generating, from selected segments of the plurality of the 3-D blocks of time frequency spectrum coefficients of the first video signal, a 3-D block of time frequency spectrum coefficients of the noise component; and
  where step (d) comprises the step of generating modified 3-D blocks of time frequency spectrum coefficients which represent the second video signal from sums and differences of corresponding coefficients of the 3-D blocks of time frequency spectrum coefficients of the first video signal and the 3-D block of time frequency spectrum coefficients of the noise component.

11. A method according to claim 10 where step (d) comprises:
determining sums of corresponding coefficients of each of the 3-D blocks of time frequency spectrum coefficients of the first video signal and the 3-D block of time frequency spectrum coefficients of the noise component if the corresponding coefficient of the 3-D block of time frequency spectrum coefficients of the first video signal is less than or equal to zero and the corresponding coefficient of the 3-D block of time frequency spectrum coefficients of the first video signal is greater than or equal to the corresponding coefficient of the 3-D block of time frequency spectrum coefficients of the noise component in magnitude;
determining differences of corresponding coefficients of each of the 3-D blocks of time frequency spectrum coefficients of the first video signal and the 3-D block of time frequency spectrum coefficients of the noise component if the corresponding coefficient of the 3-D block of time frequency spectrum coefficients of the first video signal is greater than zero and the corresponding coefficient of the 3-D block of time frequency spectrum coefficients of the first video signal is greater than or equal to the corresponding coefficient of the 3-D block of time frequency spectrum coefficients of the noise component in magnitude; and
generating modified 3-D blocks of time frequency spectrum coefficients which represent the second video signal from the determined sums and differences of the corresponding coefficients of the 3-D blocks of time frequency spectrum coefficients of the first video signal and the 3-D blocks of time frequency spectrum coefficients of the noise component.

12. A system for processing a first video signal having a noise component to produce a second video signal representative of the first video signal with the noise component reduced, said system comprising:
sampling means for taking corresponding data samples in a plurality of frames of the first video signal to produce three dimensional (3-D) blocks of time spatial samples of the first video signal;
first transforming means for transforming the 3-D blocks of time spatial samples of the first video signal to produce 3-D blocks of time frequency spectrum coefficients of the first video signal;
noise generating means for generating, from selected segments of the 3-D blocks of time frequency spectrum coefficients of the first video signal, a 3-D block of time frequency spectrum coefficients of the noise component;
modifying means for modifying the 3-D blocks of time frequency spectrum coefficients of the first video signal as a function of the 3-D block of time frequency spectrum coefficients of the noise component to produce modified 3-D blocks of time frequency spectrum coefficients which represent the second video signal; and
second transforming means for transforming the modified 3-D blocks of time frequency spectrum coefficients which represent the second video signal to produce corresponding 3-D blocks of data samples in a plurality of frames of the second video signal.

13. A system according to claim 12, where the first transforming means and second transforming means use a 3-D orthogonal transform.

14. A system according to claim 13, where the 3-D orthogonal transform is a 3-D Discrete Cosine Transform.

15. A system for processing a first video signal having a noise component to produce a second video signal representative of the first video signal with the noise component reduced, said system comprising:
sampling means for taking corresponding data samples in a plurality of frames of the first video signal to produce three dimensional (3-D) blocks of time spatial samples representing the first video signal;
first transforming means for transforming the 3-D blocks of the spatial samples of the first video signal to produce 3-D blocks of time frequency spectrum coefficients representing the first video signal;
noise generating means for generating, from selected segments of the 3-D blocks of time frequency spectrum coefficients of the first video signal, a 3-D block of time frequency spectrum coefficients representing the noise component of the first video signal to the substantial exclusion of any other components;
modifying means for modifying the 3-D blocks of time frequency spectrum coefficients of the first video signal as a function of the 3-D block of time frequency spectrum coefficients which represent the noise component to produce modified 3-D blocks of time frequency spectrum coefficients which represent the second video signal, wherein the modifying means includes means for generating modified 3-D blocks of time frequency spectrum coefficients, which represent the second video signal, using sums and differences of corresponding coefficients of the 3-D blocks of time frequency spectrum coefficients of the first video signal and the 3-D block of time frequency spectrum coefficients which represent the noise component;
second transforming means for transforming the modified 3-D blocks of time frequency spectrum coefficients which represent the second video signal to produce corresponding 3-D blocks of data samples in a plurality of frames of the second video signal.

16. A system according to claim 15 wherein:
the sampling means further comprises means for generating one 3-D block of time spatial samples by using motion estimation (ME) to locate similar image content blocks of time spatial samples in each of the plurality of frames of the first video signal and for forming the one 3-D block of time spatial samples from the selected similar image contents blocks of time spatial samples located by the ME;
the first transforming means further comprises means for transforming the one 3-D block of time spatial samples to a one 3-D block of time frequency spectrum coefficients; and
the noise generating means comprises means for generating, from the one 3-D block of time frequency spectrum coefficients, a 3-D block of time frequency spectrum coefficients of the noise component.

17. A system according to claim 15 where the noise generating means comprises:

means for selecting a plurality of 3-D blocks of time frequency spectrum coefficients of the first video signal, the selected blocks representing image content areas of the first video signal that should not change from frame to frame in the plurality of frames of the first video signal; and means for generating, from selected segments of the plurality of the 3-D blocks of time frequency spectrum coefficients of the first video signal, a 3-D block of time frequency spectrum coefficients of the noise component.

18. A system according to claim 17, wherein the noise generating means selects the plurality of the 3-D blocks of time frequency spectrum coefficients of the first video signal from image content areas of the first video signal that represent horizontal or vertical blanking intervals of the first video signal.

19. A system according to claim 15 where the modifying means comprises:

means for determining square roots of sums of squares of corresponding coefficients of each 3-D block of time frequency spectrum coefficients of the first video signal and the 3-D block of time frequency spectrum coefficients of the noise component, where the time frequency spectrum coefficients of the first video signal have a sign; and means for generating modified 3-D blocks of time frequency spectrum coefficients, which represent the second video signal, using the determined square roots and the sign of the corresponding coefficients of the 3-D blocks of time frequency spectrum coefficients of the first video signal.

20. A system according to claim 15 wherein:

the sampling means further comprises means for generating, one 3-D block of time spatial samples by using motion estimation (ME) to locate similar image content blocks of time spatial samples in each of the plurality of frames of the first video signal and for forming the one 3-D block of time spatial samples from the selected similar image contents blocks of time spatial samples located by the ME;

the first transforming means further comprises means for transforming the one 3-D block of time spatial samples to a one 3-D block of time frequency spectrum coefficients;

the noise generating means comprises means for generating, from the one 3-D block of time frequency spectrum coefficients, a 3-D block of time frequency spectrum coefficients of the noise component; and the modifying means comprises:

means for determining square roots of sums of squares of corresponding coefficients of each 3-D block of time frequency spectrum coefficients of the first video signal and the 3-D block of time frequency spectrum coefficients of the noise component, where the time frequency spectrum coefficients of the first video signal have a sign; and means for generating modified 3-D blocks of time frequency spectrum coefficients, which represent the second video signal, using the determined square roots and the sign of the corresponding coefficients of the 3-D blocks of time frequency spectrum coefficients of the first video signal.

21. A system according to claim 15 wherein:

the noise generating means comprises:

means for selecting a plurality of 3-D blocks of time frequency spectrum coefficients of the first video signal, the selected blocks representing image content areas of the first video signal that should not change from frame to frame in the plurality of frames of the first video signal; and means for generating, from selected segments of the plurality of the 3-D blocks of time frequency spectrum coefficients of the first video signal, a 3-D block of time frequency spectrum coefficients of the noise component; and the modifying means comprises means for generating modified 3-D blocks of time frequency spectrum coefficients, which represent the second video signal, using sums and differences of corresponding coefficients of the 3-D blocks of time frequency spectrum coefficients of the first video signal and the 3-D block of time frequency spectrum coefficients of the noise component.

22. A system according to claim 21 where the modifying means comprises:

means for determining sums of corresponding coefficients of each of the 3-D blocks of time frequency spectrum coefficients of the first video signal and the 3-D block of time frequency spectrum coefficients of the noise component if the corresponding coefficient of the 3-D block of time frequency spectrum coefficients of the first video signal is less than or equal to zero and the corresponding coefficient of the 3-D block of time frequency spectrum coefficients of the first video signal is greater than or equal to the corresponding coefficient of the 3-D block of time frequency spectrum coefficients of the noise component in magnitude;

means for determining differences of corresponding coefficients of each of the 3-D blocks of time frequency spectrum coefficients of the first video signal and the 3-D block of time frequency spectrum coefficients of the noise component if the corresponding coefficient of the 3-D block of time frequency spectrum coefficients of the first video signal is greater than zero and the corresponding coefficient of the 3-D block of time frequency spectrum coefficients of the first video signal is greater than or equal to the corresponding coefficient of the 3-D block of time frequency spectrum coefficients of the noise component in magnitude; and means for generating modified 3-D blocks of time frequency spectrum coefficients, which represent the second video signal, using the determined sums and differences of the corresponding coefficients of the 3-D blocks of time frequency spectrum coefficients of the first video signal and the 3-D block of time frequency spectrum coefficients of the noise component.

* * * * *

UNITED STATES PATENT AND TRADEMARK OFFICE
CERTIFICATE OF CORRECTION

PATENT NO.   : 5,327,242
DATED        : July 5, 1994
INVENTOR(S)  : Naimpally et al.

It is certified that error appears in the above-identified patent and that said Letters Patent is hereby corrected as shown below:

Column 13, line 31, claim 4, after "3-D" insert --block of time frequency spectrum coefficients of the--.

Signed and Sealed this

Eighteenth Day of October, 1994

Attest:

BRUCE LEHMAN

*Attesting Officer*          *Commissioner of Patents and Trademarks*